(12) United States Patent
Li

(10) Patent No.: US 11,722,364 B1
(45) Date of Patent: Aug. 8, 2023

(54) NETWORK BACKUP PATH DETECTION USING GEOSPATIAL DATA

(71) Applicant: Amazon Technologies, Inc., Seattle, WA (US)

(72) Inventor: Xiaonan Li, Kirkland, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/314,616

(22) Filed: May 7, 2021

(51) Int. Cl.
*H04L 41/0677* (2022.01)
*H04L 45/00* (2022.01)
*H04L 45/28* (2022.01)

(52) U.S. Cl.
CPC .......... *H04L 41/0677* (2013.01); *H04L 45/22* (2013.01); *H04L 45/28* (2013.01)

(58) Field of Classification Search
CPC ............. H04L 41/0654; H04L 41/0663; H04L 41/0668; H04L 41/0677; H04L 41/145; H04L 45/22; H04L 45/247; H04L 45/28
See application file for complete search history.

(56) References Cited

U.S. PATENT DOCUMENTS

| | | | |
|---|---|---|---|
| 10,142,015 B2* | 11/2018 | Chen | H04B 10/07955 |
| 2012/0166446 A1* | 6/2012 | Bowman | G06F 16/2246 707/743 |
| 2017/0063658 A1* | 3/2017 | Ashwood-Smith | H04L 45/22 |
| 2018/0278466 A1* | 9/2018 | McCormick | H04L 41/0654 |
| 2021/0105173 A1* | 4/2021 | Gerstel | H04L 41/065 |

* cited by examiner

*Primary Examiner* — Pao Sinkantarakorn
(74) *Attorney, Agent, or Firm* — Klarquist Sparkman, LLP

(57) ABSTRACT

Technologies are provided for detecting backup network paths in a computer network using geospatial data. Geospatial data for network links in a computer network can be used to identify network links that are located within a specified distance to one another. Network links located within the specified distance to one another can be considered to share the same or similar risks of failure. Network links located within the specified distance to one another can be included in shared risk resource groups (SRRGs), such as shared risk link groups (SRLGs). The SRRGs can be used to identify a backup path for a network path that does not include any network links that are in SRRGs that also contain network links in the network path. The backup path can be used to transmit data if a failure is detected in one or more links in the network path.

13 Claims, 7 Drawing Sheets

NETWORK BACKUP PATH DETECTION USING GEOSPATIAL DATA

BACKGROUND

In some scenarios when a failure of a link in a computer network is detected, an alternative route through the network, which does not involve the failed link, can be identified. In some such scenarios, network links which may share some risks of failure with the failed link may be excluded from the alternative route. In some cases, network links that share failure risks can be identified using shared risk resource groups (SRRGs), such as shared risk link groups (SRLGs). In order to reduce the time and/or computational load involved with identifying an alternative route, in some cases alternative routes can be pre-calculated using fast re-routing (FRR) routing logic.

DETAILED DESCRIPTION

Figure 1:
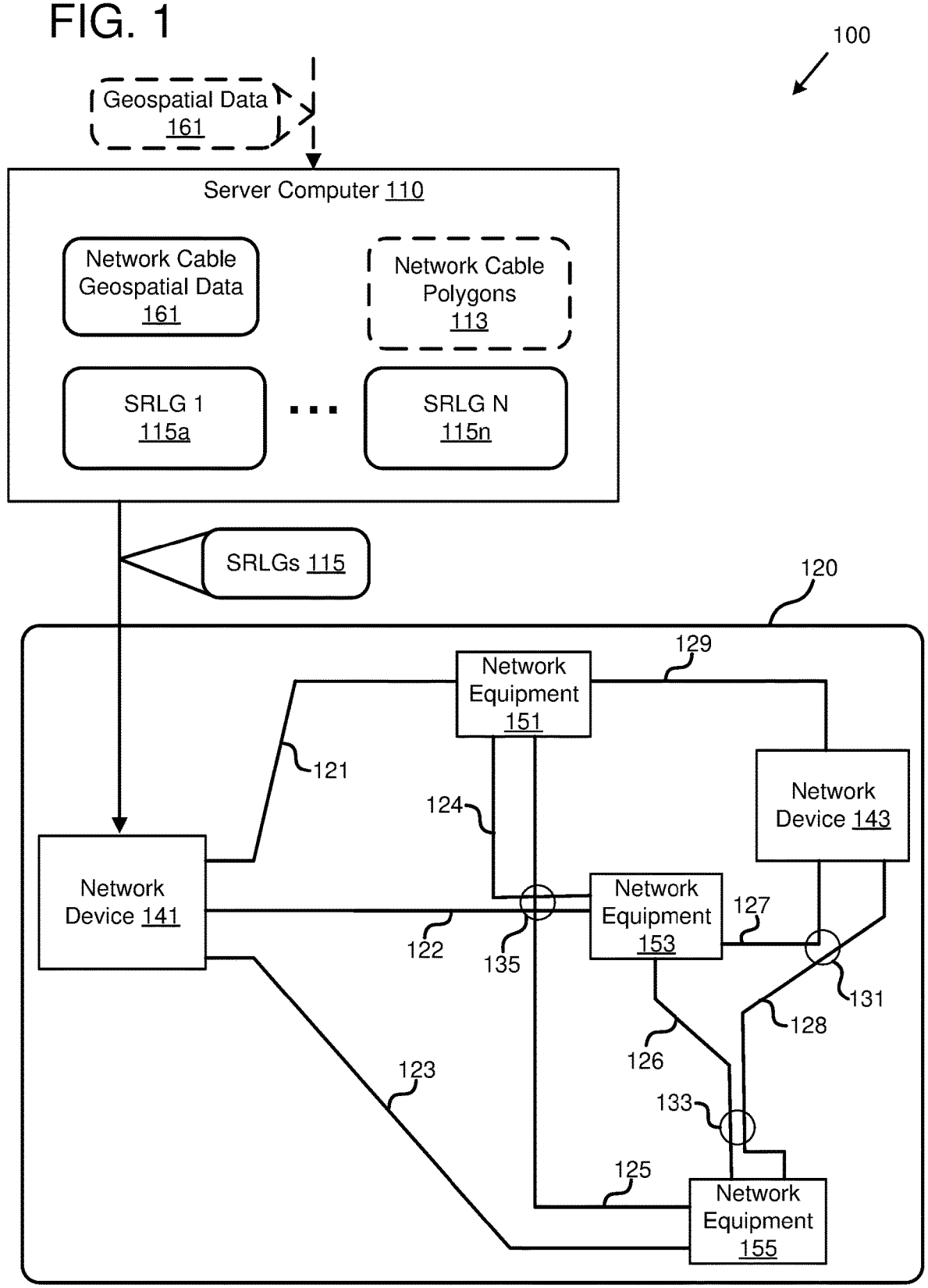
FIG. 1 is a system diagram depicting an example system configured for detecting backup network paths using geospatial data for network cables in a computer network.

The following description is directed to technologies for detecting backup paths in computer networks using geospatial data.

In at least some scenarios, when a given network path includes a network link (such as an ethernet cable, a fiber optic cable, or the like) that experiences a failure, a backup path can be used instead, which does not involve the failed network link. In at least some cases, shared risk resource groups (such as shared risk link groups (SRLGs)) can be used to identify a backup path that does not include any network links that share risk with the failed network link. This may be desirable in some cases, since there may be a higher likelihood that network links which share a risk of failure with the failed link have also failed (or may fail in the near future).

SRLGs can be defined which include network links (such as network cables) that are bundled together and/or are located in a same conduit. However, such SRLGs may not completely reflect the network links in a network which share risks of failure. For example, network links which come into close proximity to one another, but which are not bundled together or located in the same conduit, may not be reflected in such SRLGs. When a given network link experiences certain failures (such as a cut cable, an earthquake, a power outage, etc.), other network links that are physically close to the failed network link may encounter these failures, regardless of whether they are bundled directly with the failed network link.

At least some of the embodiments described herein can solve these problems by generating shared risk resource groups, such as SRLGs, based on geospatial data for network links in a computer network. Geospatial data which describes physical locations of network links in a computer network can be used to identify network links that are located within a specified distance of one another. If two network links are located within the specified distance of one another, the two network links may be subject to at least some of the same risks of failure. Such network links can be referred to as sharing risk, or sharing fate. However, if two network links never come within the specified distance of one another, then it can be determined that the two network links have diverse paths and do not share risk. Network links that are located within the specified distance of one another can be added to SRLGs to indicate that the network links share risks of failure. These SRLGs can be used to identify a backup path in a computer network that does not include any network links which share risk with any network links in a primary or preferred network path.

In a different or further embodiment, a computing device, such as a server computer, can identify the network links that share risk using the geospatial data for the network links, and can create the SRLGs based on the identified network links. The computing device can then provide the SRLGs to one or more networking devices in the computer network. The networking devices can then identify backup network paths using the SRLGs. Additionally or alternatively, the computing device can identify backup network paths using the SRLGs. In at least some embodiments, the backup network paths can be pre-calculated. Pre-calculating the backup network paths using the SRLGs, for example as part of a fast re-route (FRR) process, may reduce the time and/or computational power required by a network device to react to a detected network link failure and to transition to a backup network path that is fully diverse from the preferred network path.

FIG. 1 is a system diagram depicting an example system 100 configured for detecting backup network paths using geospatial data (e.g., 161) for network cables (e.g., 121-129) in a computer network 120. The example system 100 comprises a server computer 110 and a network device 141 in a computer network 120. In at least some embodiments, the server computer 110 can also be a part of the computer network 120.

The server computer 110 is configured to use geospatial data 161 for a plurality of network cables 121-129 in the computer network 120 to identify network cables, of the plurality of network cables 121-129, that are located within a specified distance from one another. The number and configuration of network cables within the example computer network 120 is provided for illustration purposes and is not intended to be limiting. Other numbers and configurations of network cables are also possible. In the example scenario depicted in FIG. 1, the network device 141 is connected to another network device 143 via the network cables 121-129 and network equipment 151-155. The network equipment 151-155 can comprise additional network devices, such as routers, switches, etc. In at least some embodiments, the network devices 141 and 143, and/or the network equipment 151-155, can be located in different sub-networks or different data centers. Such sub-networks or data centers can be located in geographically distant locations. For example, the network device 141 can be part of a first data center, the network equipment 151 can be part of a second data center, the network equipment 153 can be part of a third data center, the network equipment 155 can be part of a fourth data center, and the network device 143 can be part of the fifth data center. The configuration of network devices and other network equipment depicted in FIG. 1 is provided for illustration purposes and is not intended to be limiting. Other numbers and/or types of network devices and other network equipment are possible.

The network cables 121-129 are communication cables for transmitting data between devices in a computer network (such as fiber optic cables, or the like). The network cables 121-129 can travel different routes between network devices in the computer network 120. Examples of different routes that the network cables 121-129 can travel between the example network devices 141 and 143 are depicted in FIG. 1.

The geospatial data 161 for the network cables 121-129 can be used to determine the physical routes traveled by the respective network cables. For example, the geospatial data 161 can comprise one or more data structures that describe the physical positions of the network cables 121-129. In at least one embodiment, the geospatial data 161 comprises collections of geospatial coordinates (such as polar coordinates, GPS coordinates, etc.) that identify multiple points along the network cables 121-129. A plurality of such coordinates for a given network cable (e.g., 121) can be used to interpolate line segments between the coordinates which define an approximate position of the given network cable in a physical space.

The server computer 110 can identify network cables, of the plurality of network cables 121-129, that are located within a specified distance from one another based on the geospatial data 161 for the plurality of network cables 121-129. In the example depicted in FIG. 1, the server computer 110 identifies seven of the network cables 121-129 that are within the specified distance from one another based on the geospatial data 161. For example, the server computer 110 detects a location 131 at which the network cable 127 and the network cable 128 are within the specified distance from one another. For example, the server computer 110 detects a location 133 at which the network cable 126 and the network cable 128 are within the specified distance from one another.

In a further example, the server computer 110 detects a location 135 at which the network cables 122, 124, and 125 are within the specified distance from one another. In at least some embodiments, detecting that the network cables 121, 124, and 125 are within the specified distance from one another can be based on multiple operations. For example, the server computer 110 can identify that the network cable 124 and the network cable 125 are within the specified distance from one another, that the network cable 122 and the network cable 124 are within the specified distance from one another, and that the network cable 122 and the network cable 125 are within the specified distance from one another. The server computer 110 can then determine, based on these detection operations, that all three of the network cables 122, 124, and 125 are within the specified distance from one another at one or more locations.

The server computer 110 can be configured to create shared risk link groups (SRLGs) 115 that are associated with the identified network cables that are within the specified distance from one another. For example, the server computer 110 can create a first SRLG 115*a* that is associated with the network cables 122, 124, and 125. The server computer 110 can create a second SRLG 115*n* that is associated with the network cables 126 and 128. In at least some embodiments, the server computer 110 can create another SRLG associated with the network cables 127 and 128. In at least some such embodiments, the server computer 110 can detect that at least two SRLGs include a same network cable (128), and can combine the two SRLG is into a single SRLG (e.g., 115*n*).

The server computer can transmit the SRLGs 115 to the network device 141 in the computer network 120. In at least some embodiments, the server computer 110 can be connected to the computer network 120 and can transmit the SRLGs 115 to the network device 141 via one or more network cables in the computer network 120. The network device 141 can be configured to receive the SRLGs 115 from the server computer 110 and to determine one or more backup network paths for one or more network paths in the computer network 120 comprising one or more of the network cables 121-129 using the SRLGs 115.

In some embodiments, determining a backup network path can comprise identifying another network path from a source to a destination of the network path, wherein the another network path does not include any network cables that are in an SRLG that contains one or more network cables in the network path. For example, the network device 141 can identify a network path to the network device 143 comprising the network cable 122, the network cable 127, and the network equipment 153. The network device 141 can detect a first candidate backup network path to the network device 143 comprising the network cable 121, the network cable 129, and the network equipment 151. Additionally, the network device 141 can detect a second candidate backup network path to the network device 143 comprising the network cable 121, the network cable 124, the network cable 127, and the network equipment 153. Additionally, the network device 141 can detect a third candidate backup network path to the network device 143 comprising the network cable 121, the network cable 125, the network cable 128, the network equipment 151, and the network equipment 155.

The network device 141 can use the SRLGs 115 to determine that the network cable 124 and the network cable 122 are in a same SRLG (e.g., SRLG 115*a*). Based on this determining, the network device 141 can exclude the second candidate backup network path to the network device 143. Additionally, the network device 141 can use the SRLGs 115 to determine that the network cable 125 and the network cable 122 are in a same SRLG (e.g., SRLG 115*a*). Based on this determining, the network device 141 can exclude the third candidate backup network path to the network device 143. In at least some embodiments, the network device 141 can then select the first candidate backup network path as a backup network path for the network path comprising the network cable 122, the network cable 127, and the network equipment 153, since the first candidate backup network path does not include any network cables that are in an SRLG that contains any of the network cables in the network path.

In at least some embodiments, the server computer 110 can define a plurality of buffers surrounding the plurality of network cables 121-129 based on the geospatial data 161. The buffers surrounding the plurality of network cables 121-129 can be based on the specified distance. For example, a line (or plurality of line segments) representing a given network cable can be defined based on geospatial data for the network cable in the geospatial data 161. A buffer of the specified distance can be defined which surrounds the line representing the given network cable. For example, the buffer for a given network cable can be defined such that half of the specified distance lies on one side of a line representing the network cable, and the other half of the specified distance lies on the other side of the line. This process can be repeated for each of the network cables 121-129 in the computer network 120. The server computer 110 can then identify buffers, of the plurality of buffers, that overlap one another. If buffers for two of the network cables, of the plurality of network cables 121-129, overlap one another, then it can be determined that the two network cables are located within the specified distance from one another.

Additionally or alternatively, the server computer 110 can identify network cables, of the plurality of network cables 121-129, that are located within the specified distance from one another by defining a plurality of polygons for the plurality of network cables 121-129 based on the geospatial data 161 for the plurality of network cables 121-129, and by identifying polygons, of the plurality of polygons, that intersect one another. In at least some such embodiments, defining a polygon for a network cable, of the plurality of network cables 121-129, comprises defining a polygon having at least one dimension approximately equal to the specified distance, and positioning the polygon such that a center line of the polygon intersects a geospatial coordinate for the network cable in the geospatial data 161, such that approximately half of the specified distance falls on one side of the geospatial coordinate with respect to the center line of the polygon, and approximately half of the specified distance falls on an opposite side of the geospatial coordinate with respect to the center line of the polygon.

In an embodiment where identifying network cables that are located within the specified distance from one another comprises defining a plurality of polygons for the plurality of network cables 121-129, creating the SRLGs 115 that are associated with the identified network cables can comprise grouping the polygons that intersect one another into polygon groups, and defining SRLGs 115 based on the polygon groups. For example, an SRLG can be defined for a given polygon group, wherein the SRLG includes network cables, of the plurality of network cables, that are associated with polygons in the given polygon group. In at least some such embodiments, the number of polygon groups can be reduced to eliminate polygon groups that identify redundant intersections. For example, the server computer 110 can determine that at least two polygon groups, of the polygon groups, contain a polygon associated with a same network cable. The server computer 110 can combine the at least two polygon groups into a single polygon group. Once the number of polygon groups have been reduced in this way, the reduced number of polygon groups can be used to generate the SRLGs 115.

For example, the server computer 110 can define a first polygon group for the intersection detected at 133 that includes polygons associated with the network cables 126 and 128. The server computer 110 can also define a second polygon group for the intersection detected at 131 that includes polygons associated with the network cables 127 and 128. The server computer 110 can determine that the two polygon groups both include polygons associated with the network cable 128. Based on this determining, the server computer 110 can create a single polygon group that includes the network cables 126, 127, and 128.

The specified distance can be based on an analysis of risks that may impact network cables that are located in a certain proximity to one another. For example, if a given network cable experiences a failure, other network cables within a certain an area of the failed network cable may also be at risk of experiencing a failure. The specified distance can be based on a distance from the given network cable to an outer edges of such an area. In a particular embodiment, the specified distance is approximately five meters.

In at least some embodiments, the server computer 110 can be configured to receive the geospatial data 161 for the plurality of network cables 121-129. For example, the server computer 110 can receive the geospatial data 161 via one or more wired and/or wireless communication channels. In some embodiments, the server computer 110 can be connected to the computer network 120. In such an embodiment, the server computer 110 can receive the geospatial data 161 via the computer network 120. In at least some embodiments, the geospatial data is based on data received from one or more network carriers and/or fiber optic cable vendors.

In any of the embodiments described herein, a computer network can comprise a plurality of network devices configured to transmit network packets to one another. Network devices in a network can be connected by one or more network links. Network links include wired connections (such as ethernet cables, fiber optic cables, or the line). Example types of computer networks include local area networks (such as a network local to a data center), remote networks (such as networks located external to a data center containing a server computer or other computing device which communicates with the network), virtual cloud networks (such as networks comprising servers and or virtual machines operating in a cloud computing environment), remote embedded networks (such as remote networks which are hosted by third parties), satellite networks, etc. In some networks can comprise multiple datacenters or subnetworks that are connected to one another via multiple network links.

In any of the embodiments described herein, a network device can be a computing device that is part of a computer network, such as a switch, router, or other type of networking equipment that can process network packets. Such a network device can be part of a larger network of a business or organization (e.g., part of a data center network that can comprise network fabrics, such as multi-tiered network fabrics). A network device can have a number of network ports for connecting to computing devices or other network devices. The connections between the ports of the network devices may be wired communication cables, such as wired Ethernet cables, fiber optic cables, etc.

Figure 2:
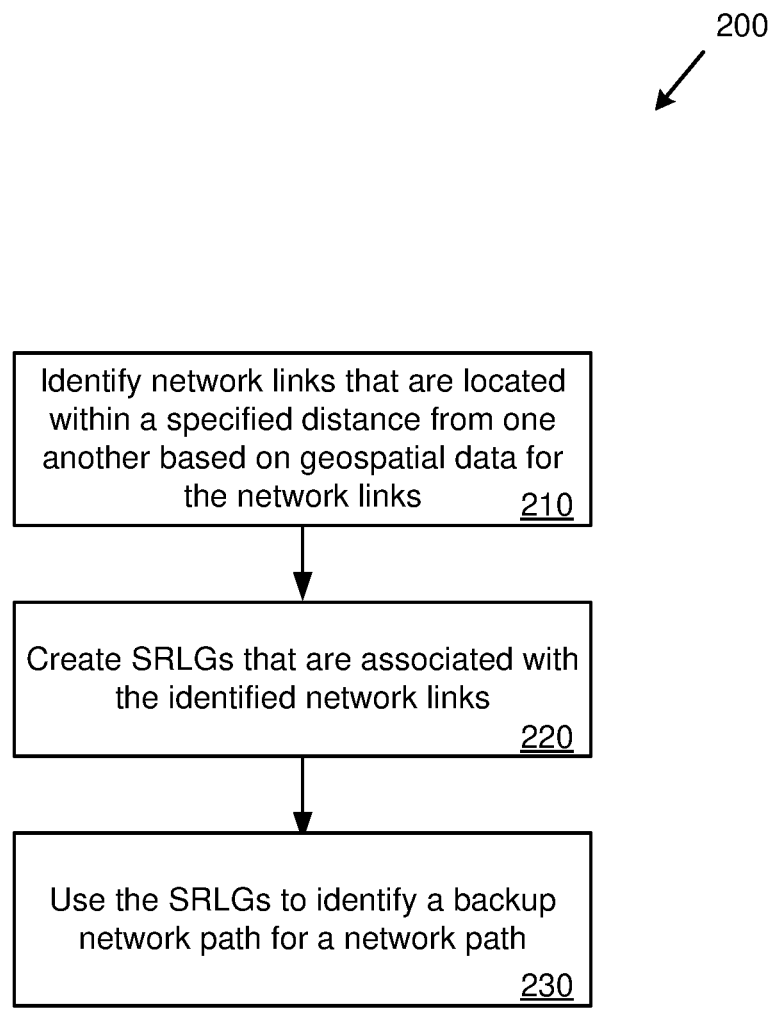
FIG. 2 is a flowchart of an example method for detecting backup network paths using geospatial data for network links in a computer network.

FIG. 2 is a flowchart of an example method 200 for detecting backup network paths using geospatial data for network links in a computer network. Any of the example systems described herein can be used to perform all or part of the example method 200.

Figure 3:
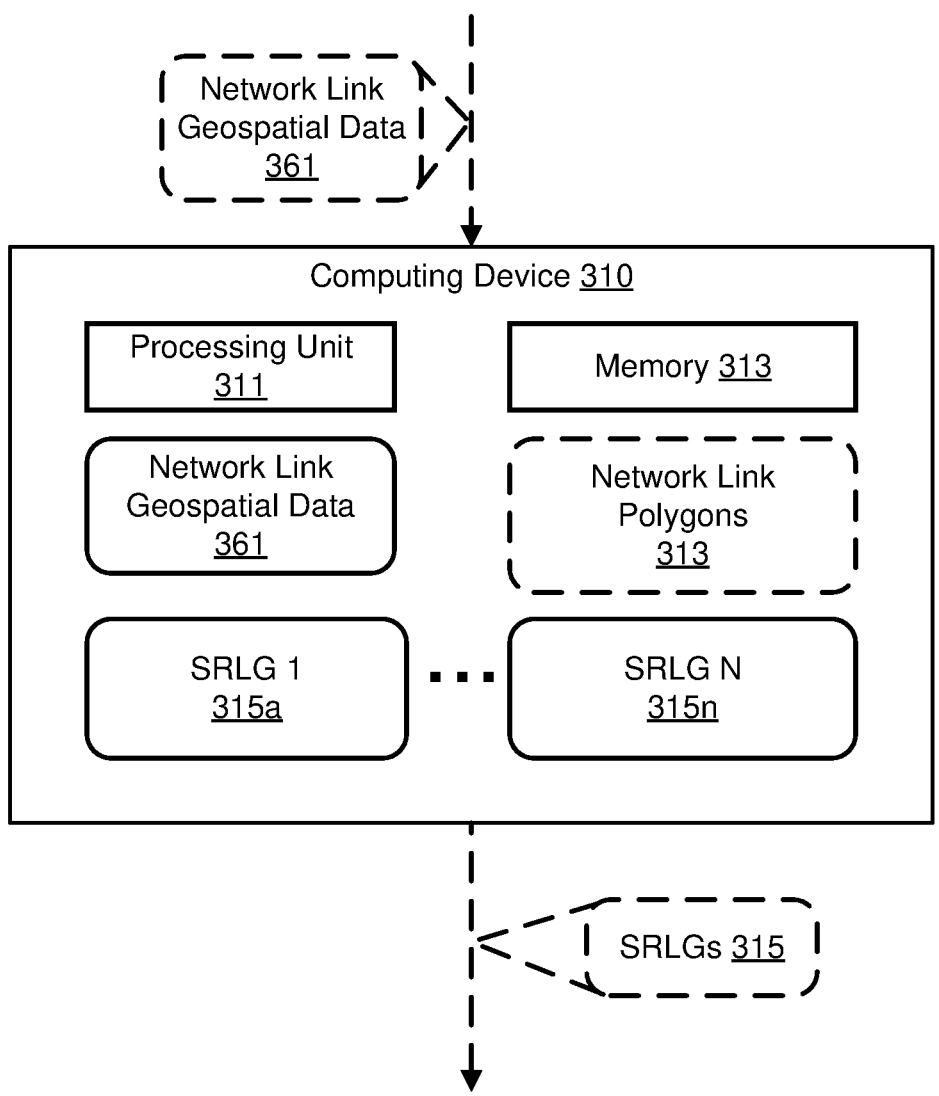
FIG. 3 is a diagram depicting an example computing device configured to generate shared risk link groups for a computer network using geospatial data for network links in the computer network.

For example, the computing device 310 depicted in FIG. 3 can be used to perform all or part of the example method 200. FIG. 3 is a diagram depicting an example computing device 310 configured to generate shared risk link groups (SRLGs) 315 for a computer network (not shown) using geospatial data 361 for network links in the computer network. The example computing device 310 comprises geospatial data 361 for a plurality of network links in the computer network. The example computing device 310 further comprises a processing unit 311 and a memory 313.

The memory 313 can store instructions that, when executed by the processing unit 311, cause the computing device 310 to perform operations as described herein. Optionally, the computing device 310 can receive the geospatial data 361 for the plurality of network links from another computing device (not shown). For example, the computing device 310 can receive the geospatial data 361 via one or more wired and/or wireless communication channels to which the computing device 310 is connected.

A network link can comprise one or more communication channels which connect one network device in a computer network to another network device in the computer network. Example network links include network cables, such as ethernet cables, fiber optic cables, telephonic communication lines, etc. In at least some embodiments, a network link can comprise a plurality of network cables that are connected directly and/or indirectly. Network paths in a computer network can comprise one or more network links which comprise a route for communication from one network device to another network device. In at least some embodiments, a network path can comprise one or more network devices connected to the one or more network links. For example, a network path from one network device to another network device can comprise one or more network links through which data is transmitted from the one network device to the another network device. In at least some such embodiments, a network path can further comprise one or more intermediary network devices connected to the network links and through which data is routed from one network link to another. Additionally or alternatively, a network path can comprise one or more network links and one or/more data centers connected by the one or more network links. For example, a computer network can comprise a plurality of data centers connected by a plurality of network links. A network path in such a network can comprise one or more network links connecting a network device in one data center to a network device in another data center. In at least some scenarios, a network path can comprise one or more network devices in an intermediate data center through which network traffic is routed from a network device in a source data center to a network device in a destination data center.

Referring to FIG. 2, at 210, network links, of a plurality of network links in a computer network, that are located within a specified distance from one another are identified using geospatial data for the plurality of network links. For example, the computing device 310 can identify network links, of the plurality of network links, that are located within a specified distance from one another based on the geospatial data 361 for the plurality of network links. In at least some embodiments, identifying the network links, of the plurality of network links, that are located within the specified distance from one another comprises defining a plurality of buffers surrounding the plurality of network links based on the geospatial data for the plurality of network links, and identifying buffers, of the plurality of buffers, that overlap one another. Such buffers can be defined based on the geospatial data 361 for the plurality of network links and the specified distance. For example, based on geospatial data for a first network link, of the plurality of network links, a first buffer of the specified size can be defined which surrounds the first network link; and a second buffer of the specified size can be defined which surrounds a second network link, of the plurality of network links, based on geospatial data for the second network link. A determination can then be made as to whether the first buffer and the second buffer overlap one another. This procedure can be repeated for each pair of network links in the plurality of network links.

Additionally or alternatively, identifying the network links, of the plurality of network links, that are within the specified distance from one another can comprise defining a plurality of polygons for the plurality of network links based on the geospatial data for the plurality of network links, and identifying polygons, of the plurality of polygons, that intersect one another. For example, the polygons can be defined based on the geospatial data 361 for the plurality of network links and the specified distance. For example, for a given network link, at least one dimension of a polygon associated with the given network link can be based on the specified distance, and at least one other dimension of the polygon associated with the given network link can be based on a length of the network link. In at least some embodiments, data structures and algorithms for detecting intersections between geometric shapes can be used to identify polygons, of the plurality of polygons, that intersect one another. In a particular embodiment, polygons that intersect one another can be identified using a quadtree data structure.

At 220, shared risk link groups (SRLGs) are created that are associated with the identified network links. For example, the computing device 310 can create the SRLGs 315 that are associated with network links, of the plurality of network links, that are located within the specified distance from one another. The number of SRLGs depicted in FIG. 3 is not intended to be limiting. The number of SRLGs that are created by the computing device 310 can be a function of the number of network links in the computer network that are located within the specified distance from one another. The computing device 310 can create an SRLG (e.g., 315a, 315n, etc.) that includes network links that are located within the specified distance from one another. In an embodiment where a plurality of buffers that surround the plurality of network links are defined based on the geospatial data 316, an SRLG can include network links associated with buffers that intersect one another.

In an embodiment where a plurality of polygons are defined for the plurality of network links based on the geospatial data 316, creating the SRLGs 315 associated with the identified network links, of the plurality of network links, can comprise grouping the polygons that intersect one another into polygon groups, and including network links associated with the polygons in a given polygon group, of the polygon groups, in an SLRG (e.g., 315a, 315n, etc.).

In at least some embodiments, creating the SRGLs 315 can comprise reducing a number of the polygon groups. For example, based on the number of intersecting polygons that are detected, it is possible that a very large number of polygon groups may be created. The number of polygon groups can be reduced in some circumstances by determining that at least two of the polygon groups contain a polygon associated with a same network link, and combining the at least two polygon groups into a single polygon group. After the number of polygon groups has been reduced, the SRLGs 315 can be created based on the reduced number of polygon groups.

At 230, the SRLGs are used to identify a backup network path for a network path in the computer network. For example, the computing device 310 can be used to identify one or more backup network paths for one or more network paths in a computer network using the SRLGs 315. Additionally or alternatively, the SRLGs 315 can be transmitted to one or more network devices that can use the SRLGs 315 to detect one or more backup paths for one or more network paths in the computer network. For example, the SRLGs 315 can be used as part of a fast re-route (FRR) process in which backup network paths are preselected to use in the event that one or more preferred network paths between network devices become unavailable. The computing device 310 (and/or one or more network devices in the computer network) can use the SRLGs 315 to identify one or more backup network paths which do not include any network links that are in one or more SRLGs with any network links included in a preferred network path. This process can be repeated for each preferred network path between network devices in the computer network.

Figure 4:
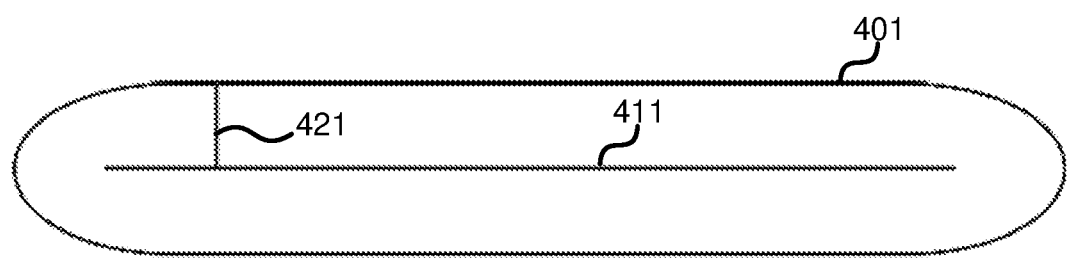
FIG. 4 is a diagram depicting an example polygon generated for a portion of a network link for use in detecting other network links that are physically close to the network link.

FIG. 4 is a diagram depicting an example polygon 401 generated for a portion of a network link 411 for use in detecting other network links that are located within a specified distance of the network link. In any of the examples depicted herein, polygons can be generated for network links and/or portions of network links. The example polygon 401 is defined using a length of the portion of the network link 411 and a specified distance 421. The polygon 401 is defined such that the perimeter of the polygon 401 is approximately the specified distance 421 away from the portion of the network link 411 on at least some of the sides of the polygon 401.

In at least some embodiments, a specified distance can be provided in terms of a width for the polygon 401. In such an embodiment, the polygon 401 can be assigned coordinates (e.g., geospatial coordinates) such that the portion of the network link 411 (or one or more geospatial coordinates associated with the portion of the network link 411) is positioned approximately along a center line of the polygon 401, with approximately half of the specified distance being located on one side of the center line with respect to the partial network link 411 (and/or one or more geospatial coordinates for the partial network link 411) and approximately half of the specified distance being located on an opposite side of the center line with respect to the partial network link 411 (and/or one or more geospatial coordinates for the partial network link).

In at least some embodiments, geospatial coordinates associated with partial network links (e.g., 411) can be provided as part of geospatial data for one or more network links in a computer network. Such geospatial data can comprise data structures in which network links (such as network cables) are represented by sequences of points and edges between the points. The points can comprise geospatial coordinates and the edges, representing network links, partial network links, etc., can be defined based on geospatial coordinates for beginning and end points of the edges. The geospatial positions of the edges that make up a given network link (or partial network link) can be interpolated using the geospatial start and end coordinates for the edges. Such an edge can then be used to generate one or more polygons (e.g., 401). Such polygons can be generated for a plurality of network links in a computer network and used to identify network links (or partial network links) that are located within a specified distance from one another.

Figure 5:
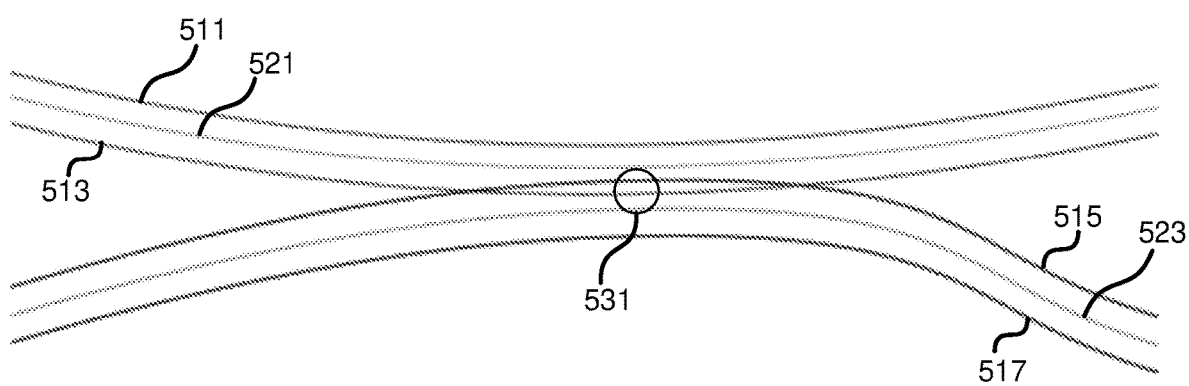
FIG. 5 is a diagram depicting an intersection of buffers associated with two network links that can be used to determine that the two network links are located within a specified distance from one another.

FIG. 5 is a diagram depicting an intersection 531 of buffers associated with two network links 521 and 523. The intersection 531 can be used to determine that the two network links 521 and 523 are located within a specified distance from one another. A buffer is defined for the network link 521 which as the outer edges 511 and 513. Another buffer is defined for the network link 523 which has the outer edges 515 and 517. In at least some embodiments, the buffers can be defined using polygons that are created using geospatial data associated with the network links 521 and 523 as described herein. The distance from one edge (e.g., 511) of a buffer to another edge (e.g., 513) of a buffer can be based on a specified distance which two network links can be from one another without having s shared risk of failure. The intersection 531 of the buffers for the network links 521 and 523 can indicate that the network links 521 and 523 are less than the specified distance apart and, thus, may have a shared risk of failure. Based on a detection of the intersection 531, the network link 521 and the network link 523 can be included in a same SRLG as described herein.

Figure 6:
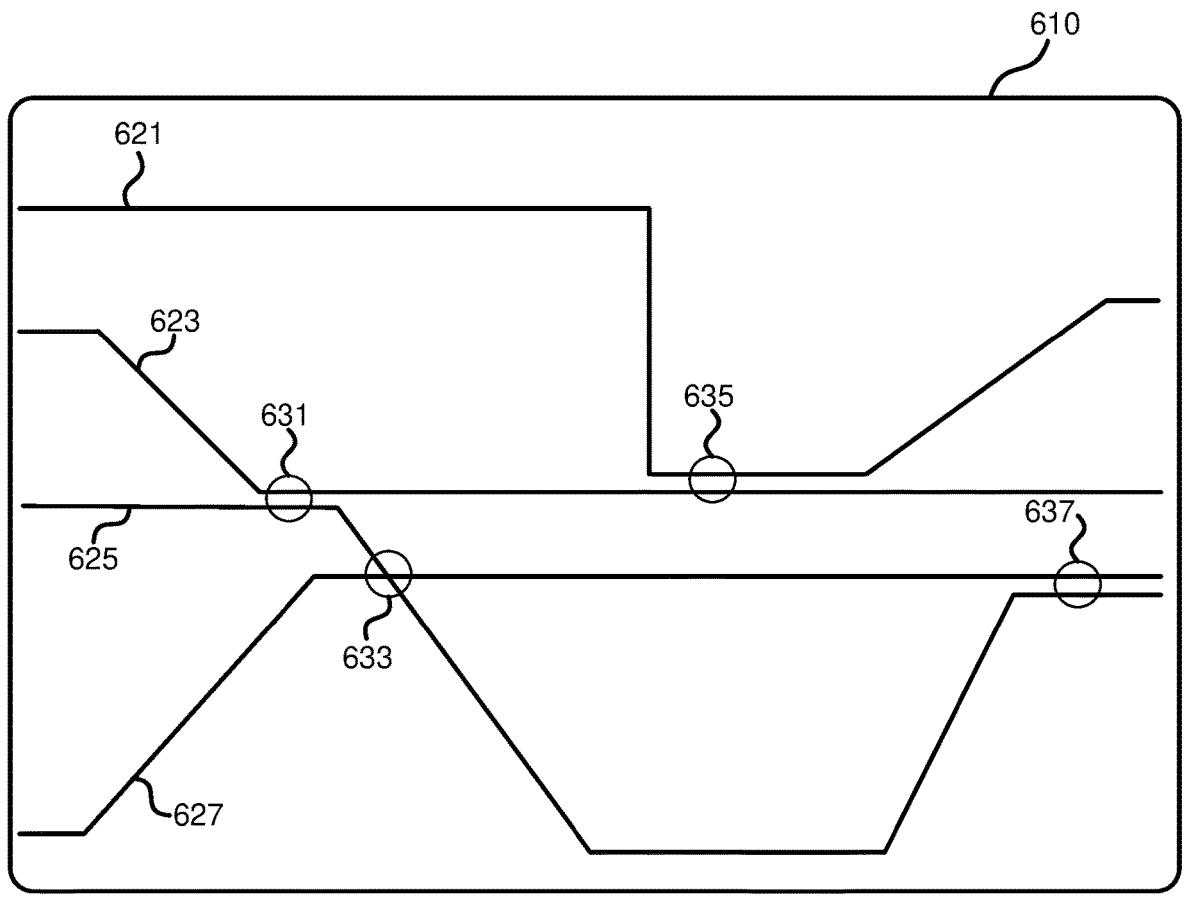
FIG. 6 is a diagram depicting an example of defining and combining groups of polygons associated with network links.

FIG. 6 is a diagram depicting an example of creating and combining groups of polygons associated with network links. FIG. 6 depicts a representation 610 of a plurality of polygons 621-627 defined for a plurality of network links in a computer network. The polygons 621-627 are depicted as lines in FIG. 6 for ease of illustration. The polygons can have one or more dimensions defined based on a specified distance within which to network links can be regarded as having a shared risk of failure. This dimensionality based on such a specified distance is reflected in FIG. 6 in detected intersections of polygons at 631, 635, and 637, where the line representations of the polygons 621-627 are not depicted as intersecting.

Polygon groups 641-645 can be defined based on the detected intersections 631-637 of the polygons 621-627. For example, the polygon group 641 includes the polygons 623 and 625, based on the intersection 631. The polygon group 643 includes the polygons 621 and 623 based on the intersection 635. The poly group 645 includes the polygons 625 and 627 based on the intersection 633. In at least some embodiments, another polygon group (not shown) can be defined based on the intersection 637. However, it can be determined that such a polygon group includes the polygons 625 and 627, which are already included in the polygon group 645. Thus, it can be determined that such a polygon group is redundant and can be eliminated.

In some scenarios, based on the number of detected intersections between polygons associated with network links, the number of polygon groups which are generated can be very large. In such scenarios, generating SRLGs based on a large number of polygon groups can result in a number of SRLGs that is too large to deal with in a computationally efficient manner. In at least some such scenarios, the number of polygon groups can be reduced before the SRLGs are created. For example, a small number of larger polygon groups can be created by combining polygon groups which share at least one polygon in common. For example, polygon groups 641 and 643 can be combined since both polygon groups include the polygon 623. Additionally, the newly combined polygon group (which now contains polygons 621-625) can be combined with the polygon group 645 since both polygon groups include the polygon 625. Thus, the polygon groups 641-645 can be combined to form the polygon group 647. The polygon group 647 can then be used to generate an SRLG that includes the network links associated with the polygons 621-627.

Figure 7:
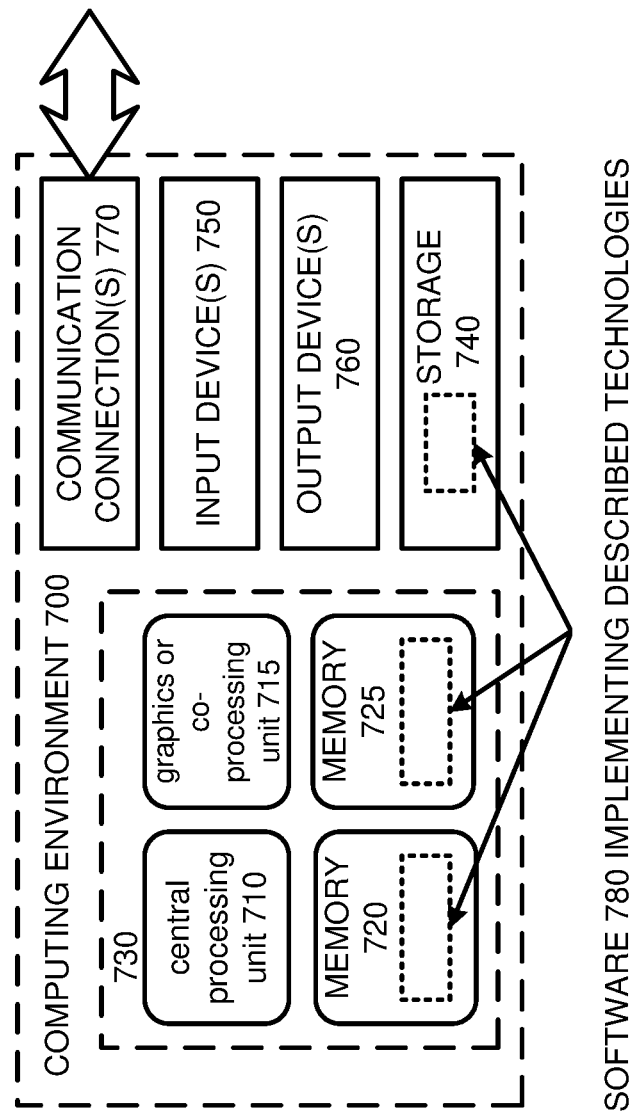
FIG. 7 is a diagram depicting a generalized example of a suitable computing environment in which the described innovations may be implemented.

FIG. 7 depicts a generalized example of a suitable computing environment 700 in which the described innovations may be implemented. The computing environment 700 is not intended to suggest any limitation as to scope of use or functionality, as the innovations may be implemented in diverse general-purpose or special-purpose computing systems. For example, the computing environment 700 can be any of a variety of computing devices (e.g., desktop computer, laptop computer, server computer, tablet computer, etc.).

With reference to FIG. 7, the computing environment 700 includes one or more processing units 710, 715 and memory 720, 725. In FIG. 7, this basic configuration 730 is included within a dashed line. The processing units 710, 715 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 7 shows a central processing unit 710 as well as a graphics processing unit or co-processing unit 715. The tangible memory 720, 725 may be volatile memory (e.g., registers, cache, RAM), non-volatile memory (e.g., ROM, EEPROM, flash memory, etc.), or some combination of the two, accessible by the processing unit(s). The memory 720, 725 can store software 780 implementing one or more innovations described herein, (for example, in the form of computer-executable instructions suitable for execution by the processing unit(s)). In at least some embodiments, the computing environment 700 can comprise a server computer, computing device, or network device as described herein.

A computing system may have additional features. For example, the computing environment 700 includes storage 740, one or more input devices 750, one or more output devices 760, and one or more communication connections 770. An interconnection mechanism (not shown) such as a bus, controller, or network interconnects the components of the computing environment 700. Typically, operating system software (not shown) provides an operating environment for other software executing in the computing environment 700, and coordinates activities of the components of the computing environment 700.

The tangible storage 740 may be removable or non-removable, and includes magnetic disks, magnetic tapes or cassettes, CD-ROMs, DVDs, or any other medium which can be used to store information in a non-transitory way and which can be accessed within the computing environment 700. The storage 740 can store instructions for the software 780 implementing one or more innovations described herein (for example in a storage medium and/or firmware of the storage 740).

The input device(s) 750 may be a touch input device such as a keyboard, mouse, pen, or trackball, a voice input device, a scanning device, or another device that provides input to the computing environment 700. The output device(s) 760 may be a display, printer, speaker, CD-writer, or another device that provides output from the computing environment 700.

The communication connection(s) 770 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier. In at least some embodiments, the communication connection(s) can connect the computing environment 700 to a computer network as described herein.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., one or more optical media discs, volatile memory components (such as DRAM or SRAM), or non-volatile memory components (such as flash memory or hard drives)) and executed on a computer (e.g., any commercially available computer, including smart phones or other mobile devices that include computing hardware). The term computer-readable storage media does not include communication connections, such as signals and carrier waves. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C, C++, Java, assembly language, or any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Application-Specific Integrated Circuits (ASICs), Program-Specific Standard Products (ASSPs), System-On-a-Chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed invention may be applied, it should be recognized that the illustrated embodiments are only examples of the invention and should not be taken as limiting the scope of the invention. We therefore claim as our invention all that comes within the scope of these claims.

What is claimed is:

1. A system comprising:
   a server computer, configured to:
      receive geospatial data for a plurality of network cables in a computer network,
      identify network cables, of the plurality of network cables, that are located within a specified distance from one another based on the geospatial data for the plurality of network cables,
      create shared risk link groups (SRLGs) associated with the identified network cables, of the plurality of network cables, and
      transmit the SRLGs to a network device in the computer network; and
   the network device, wherein the network device is configured to:
      receive the SRLGs from the server computer, and
      determine a backup network path for a network path in the computer network comprising one or more network cables, of the plurality of network cables, using the SRLGs;
   wherein the server computer identifies the network cables by being configured to:
      define a plurality of polygons for the plurality of network cables based on the geospatial data for the plurality of network cables;
      group two polygons of the polygons that intersect one another into a first polygon group;
      determine that a second polygon group contains a polygon associated with a same network cable as the first polygon group; and
      combine the first polygon group and the second polygon group into a single polygon group as a result of both the first polygon group and second polygon group having the same network cable.

2. The system of claim 1, wherein defining a polygon of the plurality of polygons for a network cable, of the plurality of network cables, comprises:
   defining the polygon having at least one dimension equal to the specified distance; and
   positioning the polygon such that a center line of the polygon intersects a geospatial coordinate in geospatial data for the network cable, such that approximately half the specified distance falls on one side of the geospatial coordinate with respect to the center line of the polygon and approximately half the specified distance falls on an opposite side of the geospatial coordinate with respect to the center line of the polygon.

3. The system of claim 1, wherein determining the backup network path comprises:
   identifying another network path from a source to a destination of the network path, wherein the another network path does not include any network cables that are in an SRLG that contains one or more of the network cables in the network path.

4. The system of claim 1 wherein the specified distance is approximately five meters.

5. A method, comprising:
   identifying network links, of a plurality of network links in a computer network, that are located within a specified distance from one another based on geospatial data for the plurality of network links;
   creating shared risk link groups (SRLGs) associated with the identified network links, of the plurality of network links; and
   using the SRLGs to identify a backup network path for a network path in the computer network;
   defining a plurality of polygons for the plurality of network links based on the geospatial data for the plurality of network links;
   identifying polygons, of the plurality of polygons, that intersect one another;
   forming a first polygon group for the identified polygons that intersect one another; and
   combining the first polygon group with a second polygon group when the first polygon group and the second polygon group include a same network cable.

6. The method of claim 5, wherein identifying the network links, of the plurality of network links, that are located within the specified distance from one another comprises:
   defining a first buffer of the specified distance surrounding a first network link, of the plurality of network links, based on geospatial data for the first network link;
   defining a second buffer of the specified distance surrounding a second network link, of the plurality of network links, based on geospatial data for the second network link; and
   determining that the first buffer and the second buffer overlap one another.

7. The method of claim 5, wherein identifying the network links, of the plurality of network links, that are located within the specified distance from one another comprises:
   defining a plurality of polygons for the plurality of network links based on the geospatial data for the plurality of network links; and
   identifying polygons, of the plurality of polygons, that intersect one another.

8. The method of claim 7, further comprising:
   identifying polygons, of the plurality of polygons, that intersect one another using a quadtree data structure.

9. The method of claim 7, wherein creating the SRLGs associated with the identified network links, of the plurality of network links, comprises:
   grouping the polygons that intersect one another into polygon groups; and
   including network links associated with polygons in a given polygon group, of the polygon groups, in an SRLG.

10. A computing device, comprising:
    geospatial data for a plurality of network links in a computer network;
    a processing unit; and
    a memory storing instructions that, when executed by the processing unit, cause the computing device to perform operations, the operations comprising:
       identifying network links, of the plurality of network links, that are located within a specified distance from one another based on the geospatial data for the plurality of the network links;
       creating shared risk link groups (SRLGs) associated with the identified network links, of the plurality of network links;
       transmitting the SRLGs to a network device in the computer network;

wherein the operations for the identifying of the network links, comprises:
defining a plurality of polygons for the SRLGs;
identifying polygons, of the plurality of polygons, that intersect one another by being within a predetermined proximity to one another;
forming a first polygon group for the identified polygons that intersect one another; and
combining the first polygon group with a second polygon group when the first polygon group and the second polygon group include a same network cable.

11. The computing device of claim 10, wherein identifying the network links, of the plurality of network links, that are located within the specified distance from one another comprises:
defining a plurality of buffers surrounding the plurality of network links based on the geospatial data for the plurality of network links; and
identifying buffers, of the plurality of buffers, that overlap one another.

12. The computing device of claim 10, further comprising:
identifying polygons, of the plurality of polygons, that intersect one another using a quadtree data structure.

13. The computing device of claim 10, wherein:
the network links comprise fiber optic cables; and
the geospatial data comprises geospatial data for the fiber optic cables.

\* \* \* \* \*